(12) United States Patent
Yoshikawa et al.

(10) Patent No.: US 11,017,803 B1
(45) Date of Patent: May 25, 2021

(54) DISK DRIVE WITH ACTUATOR ASSEMBLIES

(71) Applicants: Kabushiki Kaisha Toshiba, Tokyo (JP); Toshiba Electronic Devices & Storage Corporation, Tokyo (JP)

(72) Inventors: Norio Yoshikawa, Yokohama Kanagawa (JP); Makoto Okamoto, Kodaira Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/991,710

(22) Filed: Aug. 12, 2020

(30) Foreign Application Priority Data

Dec. 26, 2019 (JP) .............................. JP2019-236883

(51) Int. Cl.
*G11B 5/48* (2006.01)
(52) U.S. Cl.
CPC ............ *G11B 5/4833* (2013.01); *G11B 5/486* (2013.01); *G11B 5/4813* (2013.01)
(58) Field of Classification Search
CPC ....... G11B 5/4813; G11B 5/54; G11B 25/043; G11B 5/012; G11B 2007/0013
See application file for complete search history.

(56) References Cited

U.S. PATENT DOCUMENTS

| | | | | |
|---|---|---|---|---|
| 5,296,984 A * | 3/1994 | Fick | ..................... | G11B 5/4813 360/244.5 |
| 5,644,448 A * | 7/1997 | Suzuki | ................... | G11B 5/486 360/264.2 |
| 5,717,541 A * | 2/1998 | Yeas | ...................... | G11B 21/02 360/264.2 |
| 5,909,342 A * | 6/1999 | Forbord | ............ | G11B 5/59605 360/264.2 |
| 5,991,123 A * | 11/1999 | Casey | .................. | G11B 5/4833 360/264.2 |
| 6,018,439 A * | 1/2000 | Forbord | ............... | G11B 5/4833 360/264.2 |
| 6,108,174 A * | 8/2000 | Adams | ................. | G11B 5/6005 360/266.1 |
| 6,115,215 A * | 9/2000 | Adams | ................... | G11B 5/553 360/264.4 |
| 6,236,531 B1 * | 5/2001 | Allsup | ................. | G11B 5/4846 360/264.2 |

(Continued)

FOREIGN PATENT DOCUMENTS

JP 2020-149756 A 9/2020

*Primary Examiner* — Brian E Miller
(74) *Attorney, Agent, or Firm* — White & Case LLP

(57) ABSTRACT

According to one embodiment, a disk drive includes a first actuator assembly, and a second actuator assembly. In the first actuator assembly, arms each includes a slit provided at a side face of the arm, the slit expending from an extending end of the arm to a first actuator block. The slit is provided such that a central line of the slit in its width direction is offset in position from a central line of the arm in its thickness direction in a direction further away from a boundary plane between the first and second actuator assemblies. The arm have a first inclined face and a second inclined face formed at an open end portion of the slit, the first and second inclined face each inclining in a direction in which an open width of the slit widens.

12 Claims, 10 Drawing Sheets

(56) References Cited

U.S. PATENT DOCUMENTS

| | | | |
|---|---|---|---|
| 6,560,075 B2 * | 5/2003 | Price | G11B 5/4813 360/246.7 |
| 6,594,115 B2 | 7/2003 | Takagi et al. | |
| 6,603,640 B1 * | 8/2003 | Prater | F16C 19/54 360/264.4 |
| 7,154,712 B2 | 12/2006 | Hayakawa et al. | |
| 7,649,717 B2 * | 1/2010 | Hayakawa | G11B 33/121 360/264.2 |
| 7,957,101 B2 * | 6/2011 | Matsui | G11B 5/486 360/245.9 |
| 8,068,314 B1 * | 11/2011 | Pan | G11B 5/5569 360/264.2 |
| 8,699,187 B2 * | 4/2014 | Nakamura | G11B 5/4846 360/264.2 |
| 9,407,078 B2 | 8/2016 | Budagher et al. | |
| 10,304,483 B1 * | 5/2019 | Unger | G11B 5/483 |
| 10,657,993 B1 | 5/2020 | Uehara et al. | |
| 2002/0039260 A1 * | 4/2002 | Kilmer | G11B 5/5521 360/264.7 |
| 2002/0060885 A1 * | 5/2002 | Money | G11B 5/5521 360/264.4 |
| 2005/0152071 A1 * | 7/2005 | Hayakawa | G11B 33/121 360/266.3 |
| 2006/0114614 A1 | 6/2006 | Tsujino et al. | |
| 2006/0291102 A1 | 12/2006 | Honda | |
| 2007/0146935 A1 * | 6/2007 | Minami | G11B 5/4833 360/245.9 |
| 2010/0067150 A1 * | 3/2010 | Kavosh | G11B 5/4806 360/264.2 |
| 2011/0109996 A1 | 5/2011 | Nakamura et al. | |

\* cited by examiner

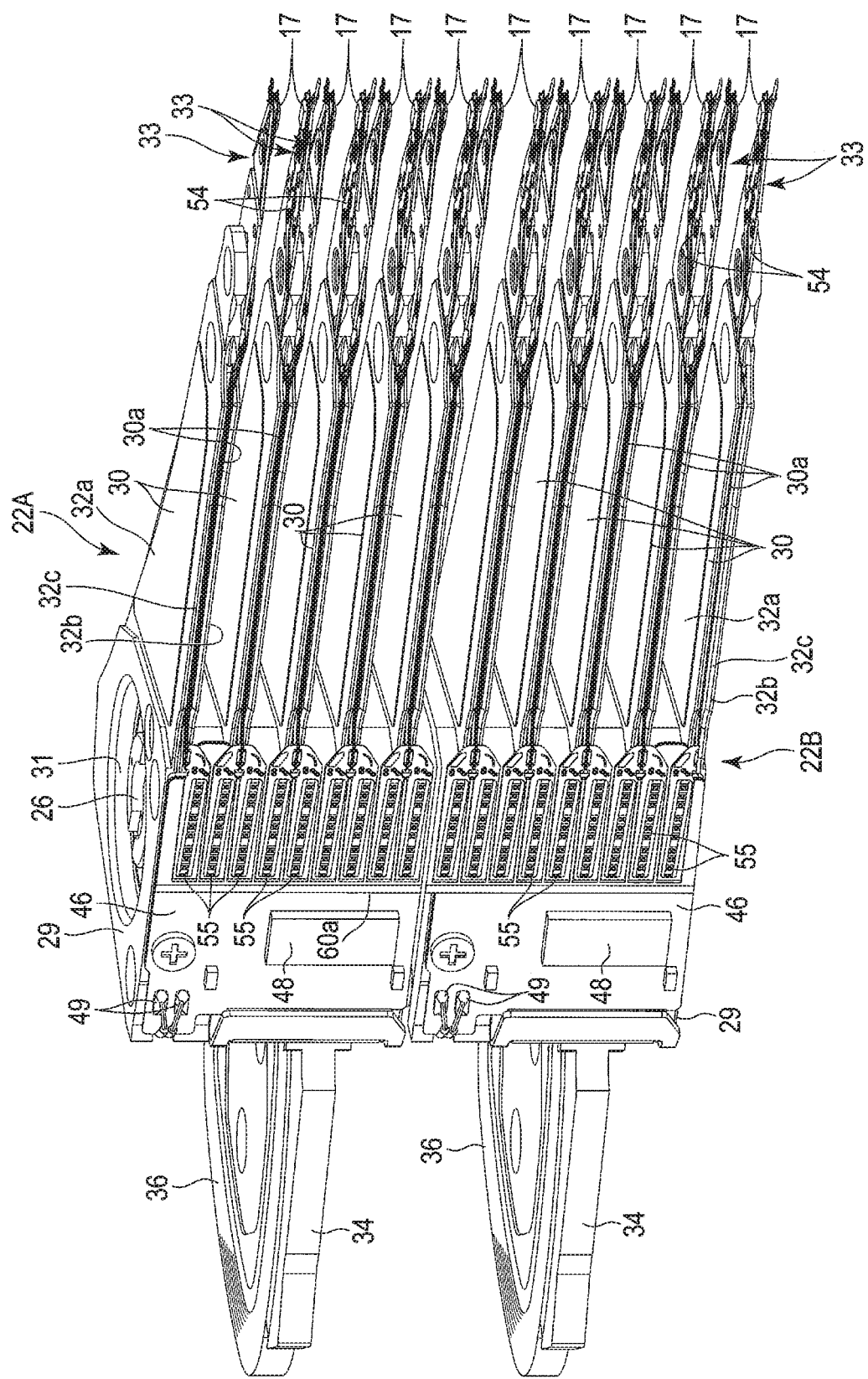
F I G. 3

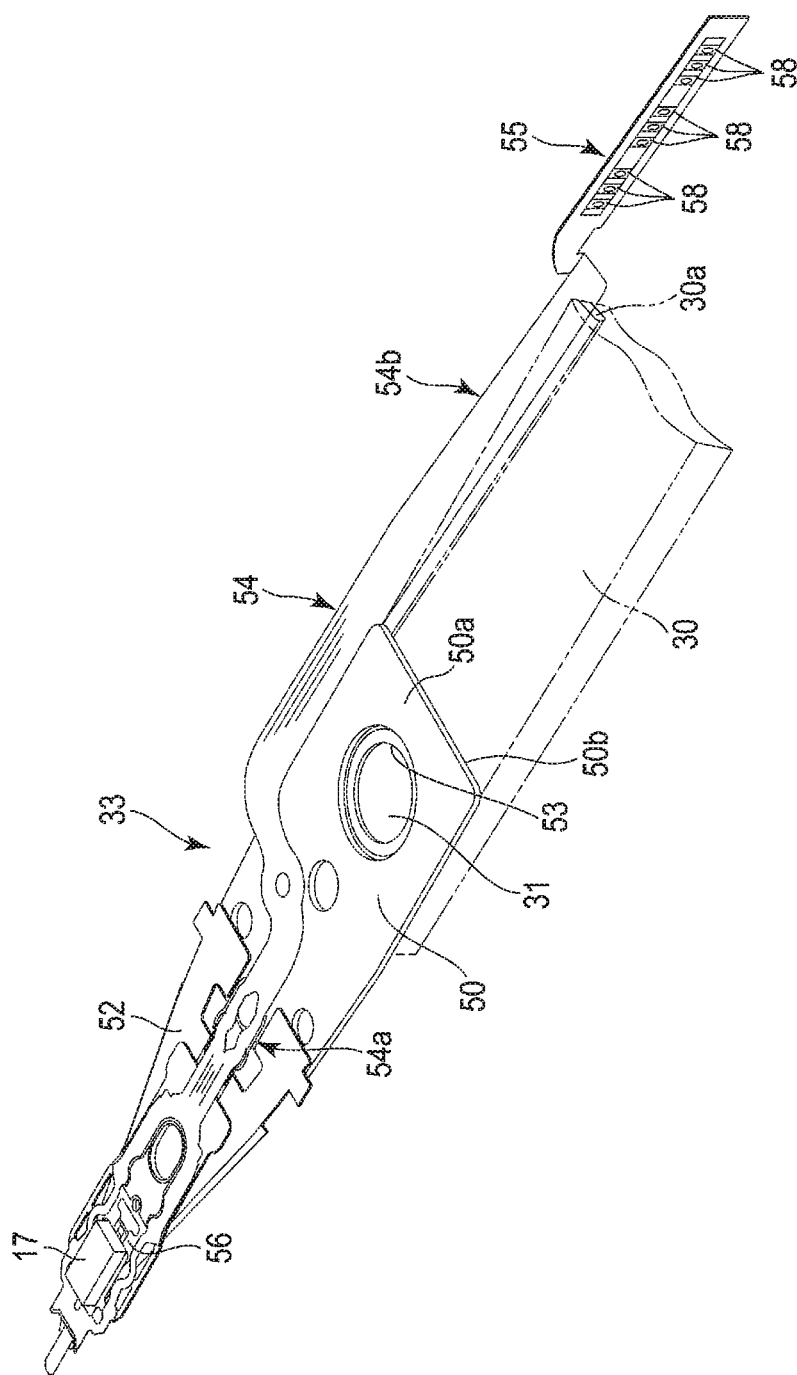
F I G. 4

DISK DRIVE WITH ACTUATOR ASSEMBLIES

CROSS-REFERENCE TO RELATED APPLICATIONS

This application is based upon and claims the benefit of priority from Japanese Patent Application No. 2019-236883, filed Dec. 26, 2019, the entire contents of which are incorporated herein by reference.

FIELD

Embodiments described herein relate generally to disk drives.

BACKGROUND

A hard disk drive (HDD) that is an exemplary disk drive, includes a magnetic disk provided in the casing of the HDD, a spindle motor that supports and drives the magnetic disk rotatably, a head actuator supporting a magnetic head, a voice coil motor that drives the head actuator, and a flexible printed circuit unit.

In recent years, along with an increase in the storage capacity of such a HDD, the number of magnetic disks to be installed tends to increase. In order to meet a large number of magnetic disks, a so-called split actuator has been proposed, in which a plurality of head actuators, for example, two head actuators resulting from division of a head actuator are disposed in layers, the two head actuators being each rotatable independently. The actuator block of one of the two head actuators is supported rotatably around a support shaft. The actuator block of the other head actuator is supported rotatably around the support shaft and is axially disposed in layers over the actuator block of the one head actuator.

In the split actuator, the two head actuators operate to turn mutually independently. Therefore, in order to secure smooth operation without mutual interference, a gap (interval) needs providing on the boundary between the two actuator blocks. Along with the division of the head actuator, a wiring board is divided into two, so that the two wiring boards are individually attached to the actuator blocks. In a case where deviation has occurred in positioning at the time of individual attachment of the wiring boards to the actuator blocks, the two wiring boards are likely to interfere mutually at the boundary portion.

BRIEF DESCRIPTION OF THE DRAWINGS

FIG. 3 is a perspective view of the actuator assemblies in alignment.

FIG. 4 is a perspective view illustrating a head suspension assembly for the actuator assemblies.

DETAILED DESCRIPTION

Figure 1:
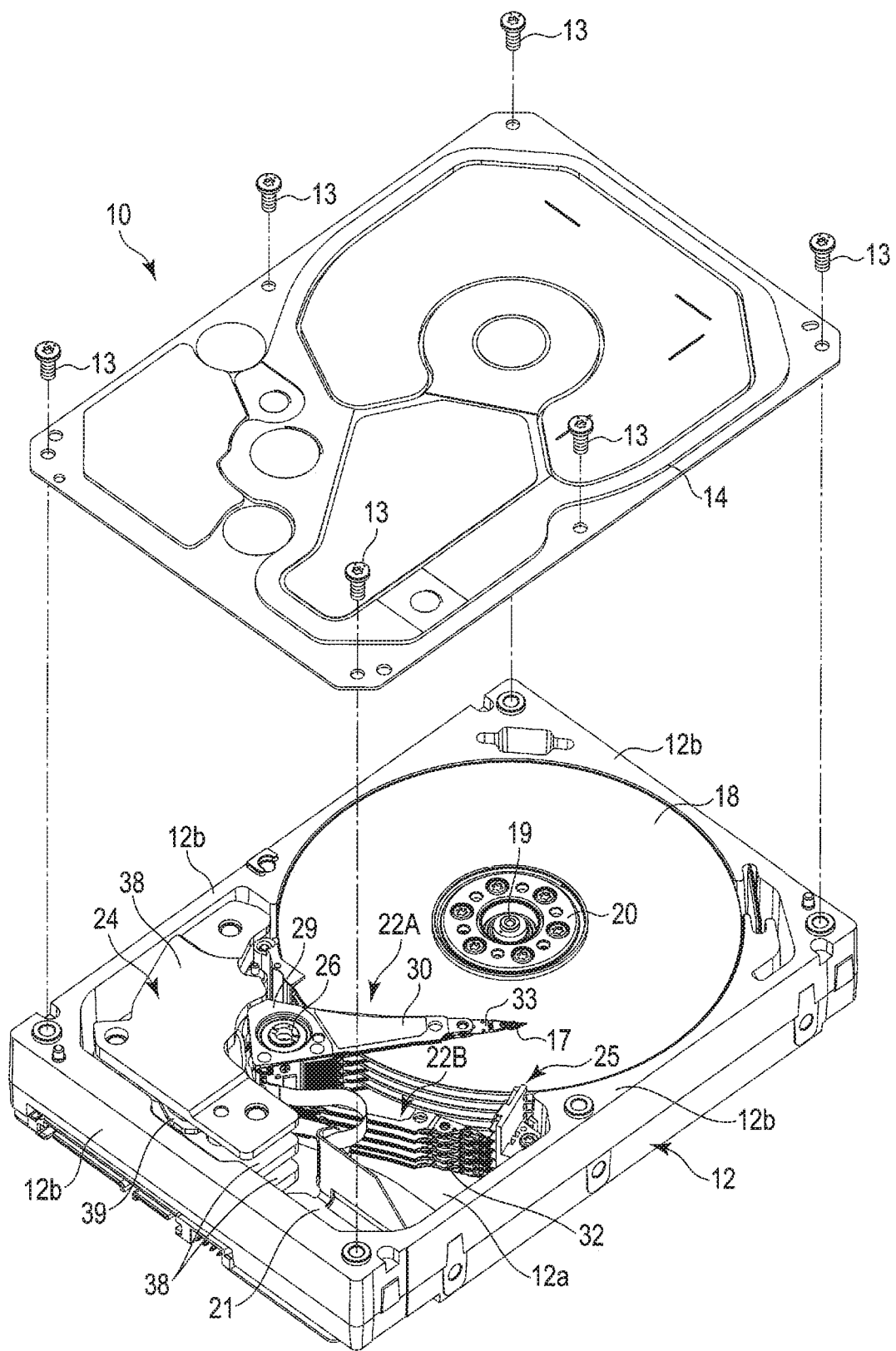
FIG. 1 is an exploded perspective view illustrating a hard disk drive (HDD) according to a first embodiment with a top cover detached.

Various embodiments will be described hereinafter with reference to the accompanying drawings. In general, according to one embodiment, a disk drive comprises: a plurality of disk-shape recording media provided rotatably; a first actuator assembly comprising: a first actuator block supported rotatably around a support shaft; a plurality of arms extending from the first actuator block; a plurality of head suspension assemblies each comprising a support plate fixed to an extending end of the respective arms, a wiring member attached to the support plate, and a head supported by the wiring member; and a first wiring board including a plurality of connection terminals and provided at the first actuator block; and a second actuator assembly comprising: a second actuator block supported rotatably around the support shaft and opposed to the first actuator block with a gap therebetween; a plurality of arms extending from the second actuator block; a plurality of head suspension assemblies each comprising a support plate fixed to an extending end of the respective arms, a wiring member attached to the support plate, and a head supported by the wiring member; and a second wiring board including a plurality of connection terminals and provided at the second actuator block. In the first actuator assembly, each of the arms includes a first face substantially parallel to the recording media, a second face opposed to the first face, a side face intersecting the first face and the second face, and a slit provided at the side face, the slit extending from the extending end of the arm to the first actuator block, the slit is provided such that a central line passing through a center of the slit in its width direction is offset in position from a central line passing through a center of the arm in its thickness direction in a direction further away from a boundary plane between the first actuator assembly and the second actuator assembly. Each of the arms includes a first inclined face and a second inclined face formed at an open end portion of the slit, the first inclined face and the second inclined face being inclined with respect to the central line of the slit in directions in which an open width of the slit widens, and each of the wiring members comprises a leading-end-side portion disposed on the support plate, a proximal end-side portion disposed in the slit of the arm and extending to the first actuator block, and a connection end portion extending from the proximal end-side portion and connected to the connection terminals of the first wiring board.

Note that the disclosure is just exemplary, and thus appropriate alterations to be conceived by those skilled in the art without departing from the gist of the invention should be rightfully included in the scope of the present invention. In addition, for more clear description, the drawings may schematically illustrate, for example, the width, thickness, or shape of each part in comparison to the actual aspects.

However, the drawings are just exemplary and thus do not limit interpretation to the present invention. In addition, in the present specification and each figure, elements similar to those described regarding already given figures are denoted with the same reference signs, and the detailed descriptions thereof may be appropriately omitted.

First Embodiment

As a disk device, a hard disk drive (HDD) according to a first embodiment will be described to in detail.

FIG. 1 is an exploded perspective view of the HDD according to the first embodiment, with a top cover detached therefrom.

The HDD comprises a housing 10 that is flat and substantially rectangular in shape. The HDD comprises a flat and substantially rectangular housing 10. The housing 10 comprises a rectangular box-shaped base 12 with an upper surface opened, and a top cover 14. The base 12 comprises a rectangular bottom wall 12a and a side wall 12b standing along the circumferential edge of the bottom wall 12a. The top cover 14 is formed, for example, of stainless steel into a shape of a rectangular plate. The top cover 14 is screwed on the sidewalls 12b of the base 12 with a plurality of screws 13, so as to close the upper opening of the base 12.

The housing 10 is provided internally with a plurality of magnetic disks, for example, nine magnetic disks 18 as a rotatable recording medium and a spindle motor 19 as a drive unit that supports and rotates the magnetic disks 18. The spindle motor 19 is provided on the bottom wall 12a. Each of the magnetic disks 18 is formed, for example, to have a diameter of 97 mm, and comprises a magnetic recording layer in an upper surface and/or lower surface thereof. The magnetic disks 18 are mutually coaxially fitted on the hub of the spindle motor 19 that is not illustrated, and additionally are fixed to the hub by clamping of a clamping spring 20. As an example, the nine magnetic disks 18 each having a thickness of 0.635 mm are disposed parallel to each other in layers at predetermined intervals (e.g., 1.58 mm). In addition, the magnetic disks 18 are supported in position parallel to the bottom wall 12a of the base 12. The spindle motor 19 rotates the plurality of magnetic disks 18 at a predetermined number of revolutions.

Note that the number of magnetic disks is not limited to nine, but may be increased or decreased.

The housing 10 accommodates a plurality of magnetic heads 17, which record and reproduce information on and from the magnetic disks 18, and a head actuator assembly 22, which supports the magnetic heads 17 such as to be movable with respect to the respective magnetic disks 18. In the embodiment, the head actuator assembly consists of a split actuator assembly divided into a plurality of actuator assemblies, for example, a first actuator assembly 22A and a second actuator assembly 22B. The first and second actuator assemblies 22A and 22B are supported pivotably around a common support shaft (pivot) 26.

The housing 10 accommodates a voice coil motor (hereinafter referred to as VCM) 24 which rotates and positions the first and second actuator assemblies 22A and 22B, a ramped loading mechanism 25 which holds the magnetic heads 17 at respective unloading positions spaced away from the respective magnetic disks 18 when the magnetic heads 32 are moved to the outermost circumferences of the respective magnetic disks 18, and a board unit (FPC unit) 21 on which electronic components such as conversion connectors are mounted.

A printed circuit board (not shown) is fixed by screws to an outer surface of the bottom wall 12a of the base 12. The printed circuit board constitutes a control unit, which controls the operation of the spindle motor 19 and also controls the respective operations of the VCM 24 and the magnetic heads 17 via the board unit 21.

Figure 2:
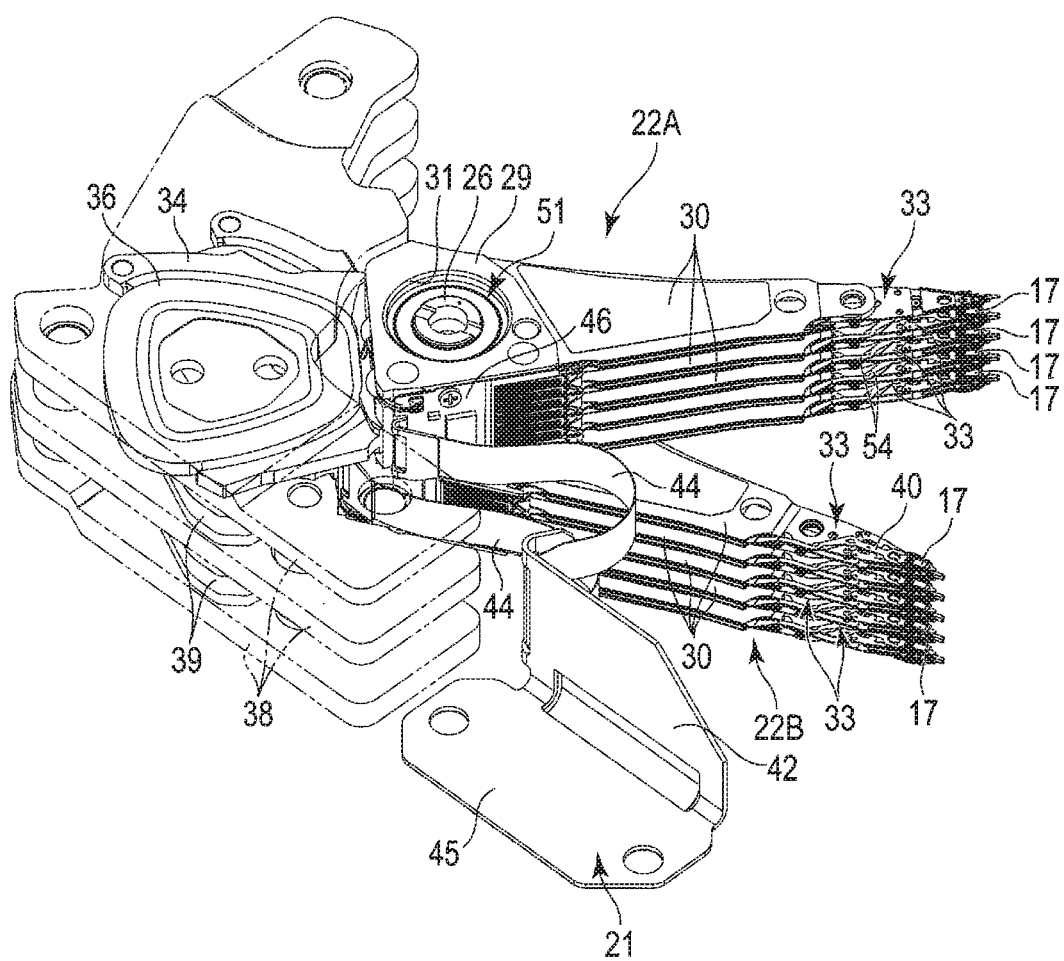
FIG. 2 is a perspective view illustrating actuator assemblies and a flexible printed circuit unit of the HDD.

FIG. 2 is a perspective view illustrating the split actuator assembly that is the head actuator assembly and the FPC unit. FIG. 3 is a perspective view of the split actuator assembly in an aligned state.

As illustrated in FIGS. 2 and 3, the split actuator assembly includes the first actuator assembly 22A and the second actuator assembly 22B. The first and the second actuator assemblies 22A and 22B are arranged one on top of the other, and also such as to be independently pivotable around the common support shaft 26 provided to stand on the bottom wall 12a of the base 12. The first actuator assembly 22A and the second actuator assembly 22B are substantially identical in structure. For example, the actuator assembly arranged in an upper side is assigned as the first actuator assembly 22A, and the one in a lower side is assigned as the second actuator assembly 22B.

The first actuator assembly 22A comprises an actuator block (first actuator block) 29, five arms 30 extending from the actuator block 29, head suspension assemblies (which may be also referred to as a head gimbal assembly (HGA)) 33 attached to the corresponding arms 30, and the magnetic heads 17 supported by the respective head suspension assemblies. The actuator block 29 comprises an inner hole 31, in which a bearing unit (unit bearing) 51 is accommodated. The actuator block 29 is supported rotatable around the support shaft 26 by the bearing unit 51.

In the present embodiment, for example, the actuator block 29 and the five arms 30 are integrally molded of aluminum, resulting in formation of a so-called E-shaped block. For example, the arms 30 are elongate and tabular in shape and extend from the actuator block 29 in a direction orthogonal to the support shaft 26. The arms 30 each have a thickness T of approximately 0.85 mm. The arms 30 each have an upper face (first main surface) 32a, a lower face (second main surface) 32b opposed parallel to the upper face, a side face 32c meeting the upper face 32a and the lower face 32b, positioned close to the magnetic disks 18, and a slit (slot or groove) 30a formed at the side face 32c. Each slit 30a extends substantially parallel to the first main surface 32a and the second main surface 32b from the actuator block 29 to the extending end of the arm 30. Part of a flexure (wiring member) which will be described later, is stored and disposed in each slit 30a.

The first actuator assembly 22A comprises a support frame 34 extending from the actuator block 29 in the direction opposite to the arms 30. A voice coil 36 is supported by the support frame 34. As illustrated in FIGS. 1 and 2, the voice coil 36 is positioned between a pair of yokes 38 provided in the base 12. Together with the yokes 38 and a magnet 39 fixed to either of the yokes 38, the voice coil 36 constitutes a VCM 24.

As illustrated in FIGS. 2 and 3, the first actuator assembly 22A comprises nine head suspension assemblies 33. Each head suspension assembly 33 is attached to the extending end of the corresponding arm 30. The plurality of head suspension assemblies 33 includes an up head suspension assembly supporting a magnetic head 17 upward and a down head suspension assembly supporting a magnetic head 17 downward. The up head suspension assembly and the down head suspension assembly are identical in structure but are disposed mutually upside down. In the present embodiment, in the first actuator assembly 22A, the down head suspension assembly is attached to the uppermost arm 30, and two head suspension assemblies 33 of the up head suspension assembly and the down head suspension assembly are attached to each of the other four arms 30.

The nine head suspension assemblies 33 extending from the five arms 30 are disposed substantially parallel to each other at predetermined intervals.

Except for the lowermost head-down suspension assembly 32, the two magnetic heads 17 supported by the other four pairs of head-down suspension assemblies and head-up suspension assemblies are located to respectively oppose each other while keeping a predetermined gap therebetween. The magnetic heads 17 are opposed in position to both faces of the corresponding magnetic disk 18. Note that the magnetic head 17 of the lowermost down head suspension assembly 33 is opposed in position to the upper face of the magnetic disk 18 disposed between the magnetic head 17 of the lowermost down head suspension assembly 33 and the magnetic head 17 of the uppermost up head suspension assembly 33 of the second actuator assembly 22B to be described below.

FIG. 4 is a perspective view showing an example of the head suspension assemblies. As shown, the suspension assembly 32 includes a substantially rectangular base plate 50, a load beam 52 of an elongate plate spring, and an elongate belt-shaped flexure (wiring member) 54. The load beam 52 is fixed and overlap by its proximal end portion to an end portion of the base plate 50. The load beam 52 is formed to extend from the base plate 50, and narrow down toward its extending end. The base plate 50 and the load beam 52 are formed of, for example, stainless steel. For example, the base plate 50 has a thickness of about 150 μm, and the load beam 52 has a thickness of about 25 to 30 μm.

The base plate 50 comprises a first surface 50a and a second surface 50b, which is a fixed surface on an opposite side. The base plate 50 includes, in its proximal end portion, a circular opening, and an annular protrusion 53 positioned around the opening. The protrusion 53 projects from the second surface 50b of the base plate 50. The base plate 50 is disposed to overlay on a bearing surface of the distal end portion 30b of the arm 30. The base plate 50 is fastened to the distal end portion 30b of the arm 30 by fitting the protrusion 53 of the base plate 50 in a caulking hole (not shown) formed in the arm 30, and caulking the protrusion 53.

The load beam 52 comprises a proximal end portion stacked on a distal end portion of the base plate 50, and is fixed to the base plate 50 by welding a plurality of locations of the load beam 52.

The flexure 54 comprises a metal plate (lining layer) such as of stainless steel, an insulating layer formed on the metal plate, a conductive layer formed on the insulating layer and constituting a plurality of wiring lines (a circuit pattern), and a cover layer (a protective layer, an insulating layer) which covers the conductive layer, which form a long and slender belt-shaped stacked layer. The flexure 54 comprises a distal end-side portion 54a and a proximal end-side portion 54b. The distal end-side portion 54a is attached on the load beam 52 and the first surface 52a of the base plate 50. The proximal end-side portion 54b extends outwards from the side edge of the base plate 50, and further extends to the proximal end portion of the arm 30 along the arm 30.

A part of the distal end-side portion 54a constitutes a displaceable gimbal portion (elastic support portion) 56. The gimbal portion 56 is located on the load beam 52. The magnetic head 17 is mounted on the gimbal portion 56. The wiring lines of the flexure 54 are electrically connected to a read element and write element of the magnetic head 17, a heater and other members.

The proximal end-side portion 54b of the flexure 54 projects out from the side edge of the base plate 50, and extends to the proximal end of the arm 30, and the actuator block 29 in through the slit 30a (see FIG. 3) formed in the side surface 32c of the arm 30. The flexure 54 comprises a connection end portion (tail connection terminal portion) 55 at the rear end of the proximal end-side portion 54b. The connection end portion 55 is formed into an elongate rectangular shape. The connection end portion 55 is bent at substantially right angles with respect to the proximal end-side portion 54b, and is located substantially perpendicular to the arm 30.

In the connection end portion 55, a plurality of, for example, nine connection terminals (connection pads) 58 are provided. The connection terminals 58 are connected to the wiring lines of the flexure 54, respectively. More specifically, the wiring lines of the flexure 54 extend over the flexure 54 substantially in its full length, and one-side ends thereof are electrically connected to the magnetic head 17, and the other-side ends are electrically connected to the connection terminals 58.

As shown in FIGS. 3 and 4, the nine connection end portions 55 are joined to a junction 46 of the flexible printed wiring board (FPC) provided in the setting surface of the actuator block 29. As will be described later, the connection terminals 58 of each connection end portion 55 are joined by solder to the connection terminals provided in the junction 46, and are electrically and mechanically joined to the FPC. The nine connection end portions 55 are arranged in the axial direction of the support shaft 26, so as to adjacent and substantially parallel to each other.

On the other hand, the second actuator assembly 22B is configured to be similar to the first actuator assembly 22A. More specifically, as shown in FIGS. 2, 3 and 4, the second actuator assembly 22B comprises an actuator block (second actuator block) 29 containing a bearing unit 51 built therein, five arms 30 extending from the actuator block 29, nine head suspension assemblies 32 attached to the respective arms 30, magnetic heads 17 mounted on the respective head suspension assemblies, and a support frame 34 which supports the voice coil 36.

The actuator block 29 is supported rotatable by the support shaft 26 via the bearing unit 51. The actuator block (second actuator block) 29 is supported by the proximal end portion (a half portion on the bottom wall 12a side) of the support shaft 26, and is disposed under the first actuator block 29 coaxially therewith. The actuator block (second actuator block) 29 is placed to oppose the first actuator block 29 with a slight aa G therebetween.

In the second actuator assembly 22B, a head-up suspension assembly 32 is attached to the lowermost arm 30, and two head suspension assemblies of a head-up suspension assembly 32 and a head-down suspension assembly 32 are mounted to each of the other four arms 30. The voice coil 36 of the second actuator assembly 22B is located between a pair of yokes 38 provided in the base 12, and constitutes a VCM 24 together with the yokes 38 and a magnet 39 fixed to one of these yokes.

The VCM 24 which drives the first actuator assembly 22A and the VCM 24 which drives the second actuator assembly 22B are provided such as to be independent from each other. With this structure, the first actuator assembly 22A and the second actuator assembly 22B can be driven (pivoted) independent from each other.

As shown in FIG. 2, the FPC unit 21 includes a substantially rectangular base portion 42, two long and slender belt-like relay portions 44 extending from one side edge of the base portion 42, and two junctions (a first wiring board and a second wiring board) 46 each provided continuously to a tip of the relay portion 44, which are integrated as one body. The base portion 42, the relay portion 44, and the junction 46 are each formed from a flexible printed circuit board (FPC).

The flexible printed circuit board comprises an insulating layer such as of polyimide, a conductive layer provided on the insulating layer and forming wiring lines, connection pads and the like, and a protective layer which covers the conductive layer.

On the base portion 42, electronic parts such as a conversion connector (not shown) and a plurality of capacitors are mounted, and are electrically connected to wiring lines (not shown). To the base portion 42, a metal plate 45 which functions as a reinforcing board is attached. The base portion 42 is placed on the bottom wall 12a of the base 12. The two relay portions 44 extend from a side edge of the base portion 42 towards the first and second actuator assemblies 22A and 22B. The junction 46 provided in the extending end of each of the relay portion 44 is attached to one side surface (setting surface) of the actuator block 29 via a lining board, which will be described later, and further fixed to the setting surface with fixation screws.

Figure 5:
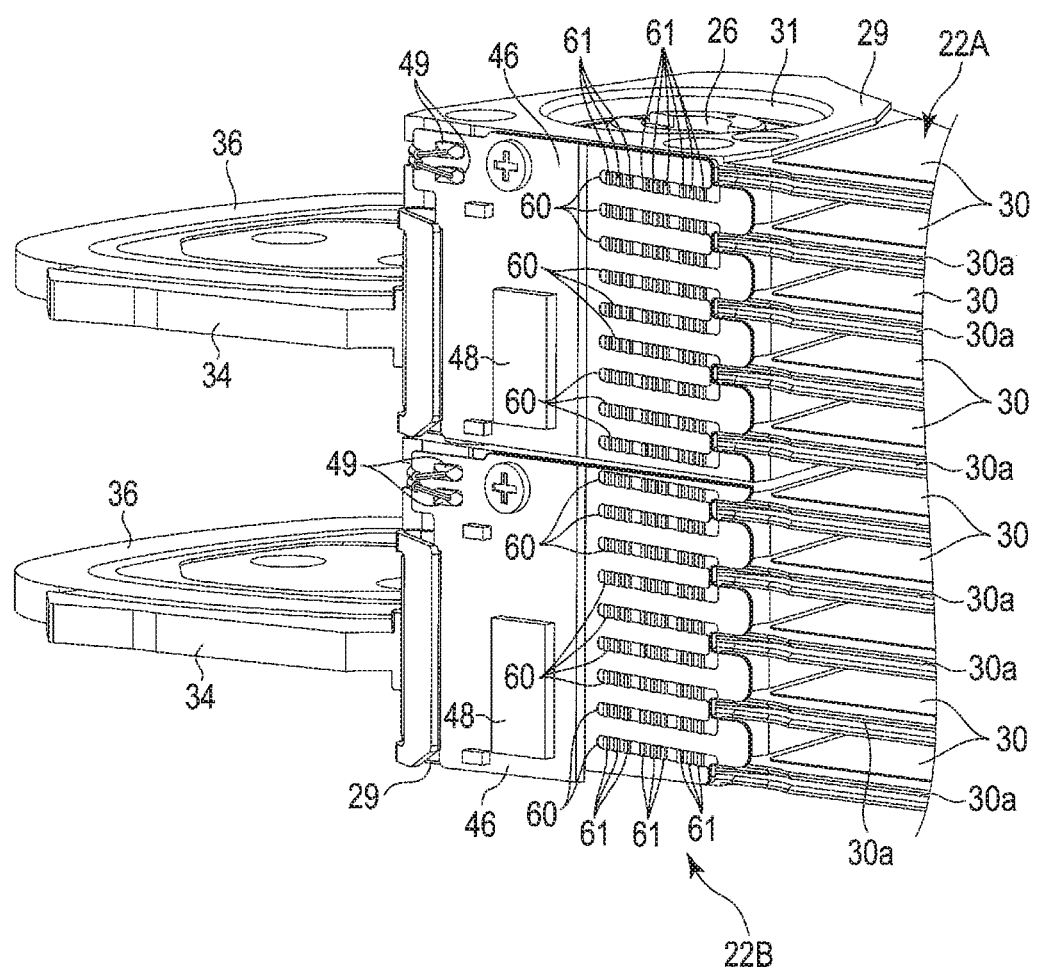
FIG. 5 is a perspective view illustrating the actuator assemblies with no flexure of which a connection end portion has been coupled.

FIG. 5 is a perspective view showing the actuator assemblies in the state where the connection end portions of the flexures have not been joined.

As shown, each of the junctions 46 of the FPC unit 21 is formed into a rectangular shape a size of which is slightly smaller than that of the setting surface (side surface) of the actuator block 29. On a rear surface of each junction 46, a lining board made of, for example, aluminum is attached as a reinforcing board. The lining board is formed into substantially the same size and shape as those of the respective junction 46. The junctions 46 are each attached and screwed to the setting surface of the actuator block 29 via the respective lining boards.

The junctions 46 each comprises nine connection pad groups 60, which correspond to the connection end portions 55 of the respective flexures 54. Each of the connection pad groups 60 contains, for example, nine connection pads 61 arranged in one row. The connection pads 61 are each electrically connected to the base portion 42 via the wiring lines of the FPC. The connection pad groups 60 each extend in a direction slightly inclined to a direction substantially orthogonal to the support shaft 26. The nine connection pad groups 60 are arranged in the axial direction of the support shaft 26 while maintaining gaps respectively therebetween. The nine connection pad groups 60 are provided in respective positions adjacent to the proximal ends of the respective arms 30 in the junction 46.

On the junction 46, a head IC (head amplifier) 48 is mounted and the head IC 48 is connected to the connection pads 61 and the base portion 42 via the wiring lines. Further, the junction 46 comprises connection pad 49 to which the voice coil 36 is connected.

As shown in FIG. 3, the connection end portion 55 of each flexure 54 is disposed to overlap the corresponding connection pad group 60 of the respective junction 46, and the nine connection terminals 58 of the connection end portion 55 are joined electrically and mechanically to the corresponding connection pads 61, respectively, by solder.

Thus, the nine magnetic heads 17 of the first actuator assembly 22A are each electrically connected to the base portion 42 via the wiring lines of the respective flexures 54, the connection end portions 55, the junction 46 of the FPC unit 21, and the relay portion 44. Similarly, the nine magnetic heads 17 of the second actuator assembly 22B are each electrically connected to the base portion 42 via the wiring lines of the respective flexures 54, the connection end portions 55, the junction 46 of the FPC unit 21, and the respective relay portion 44. Further, the base portion 42 is electrically connected to the printed circuit board on a bottom surface side of the housing 10 via the conversion connector.

Figure 6:
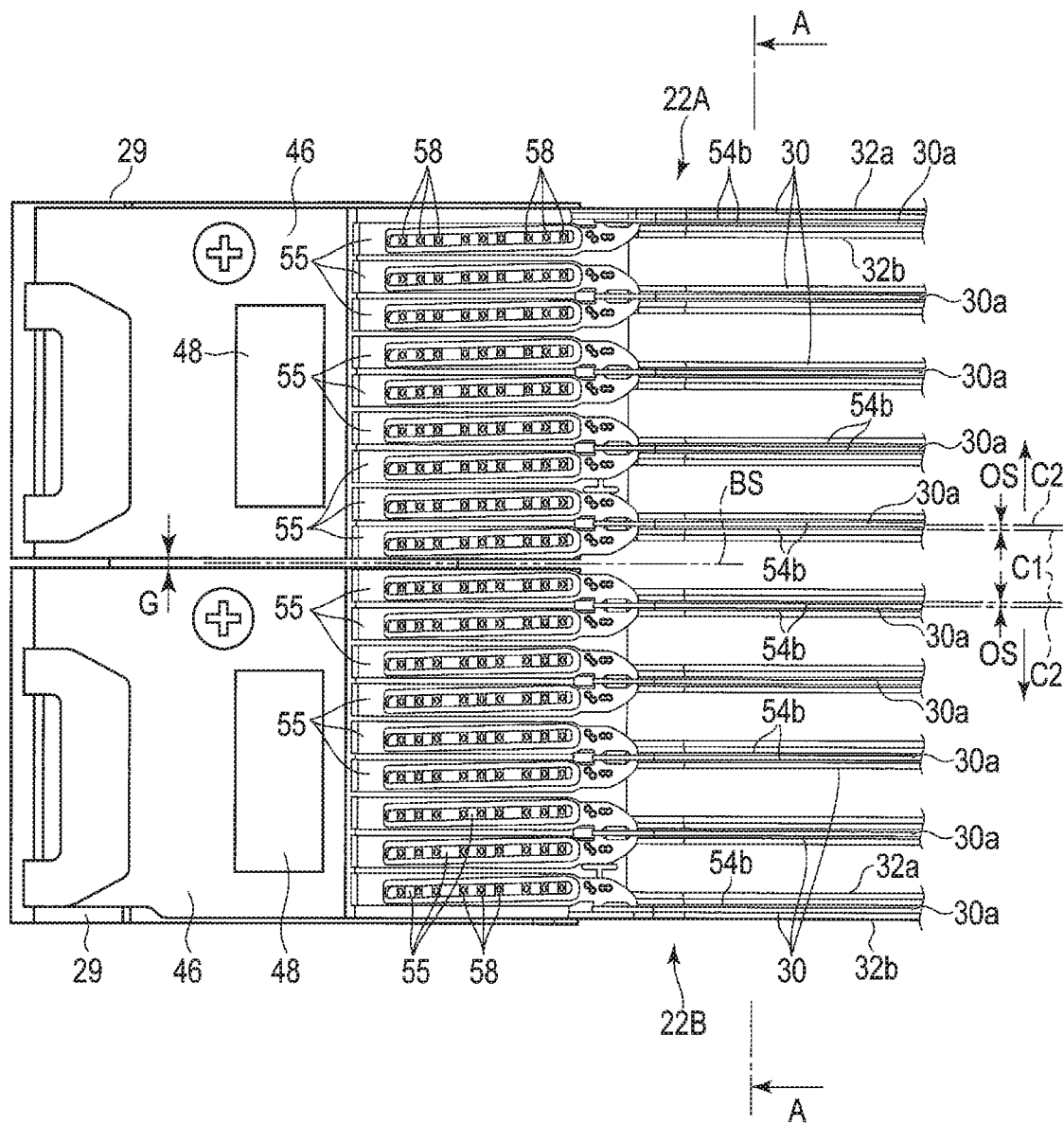
FIG. 6 is a side view illustrating actuator blocks, connection end portions, and arms of the actuator assemblies.

Next, the arrangement of the connection end portions 55 with respect to the junction 46 and the structure of the boundary portion between the actuator blocks will be described in detail. FIG. 6 is a side view showing the junctions of the actuator assemblies and FIG. 7 is a side view partially showing the actuator block in the state where the junctions and flexures of the FPC unit are not attached, and arms.

Figure 7:
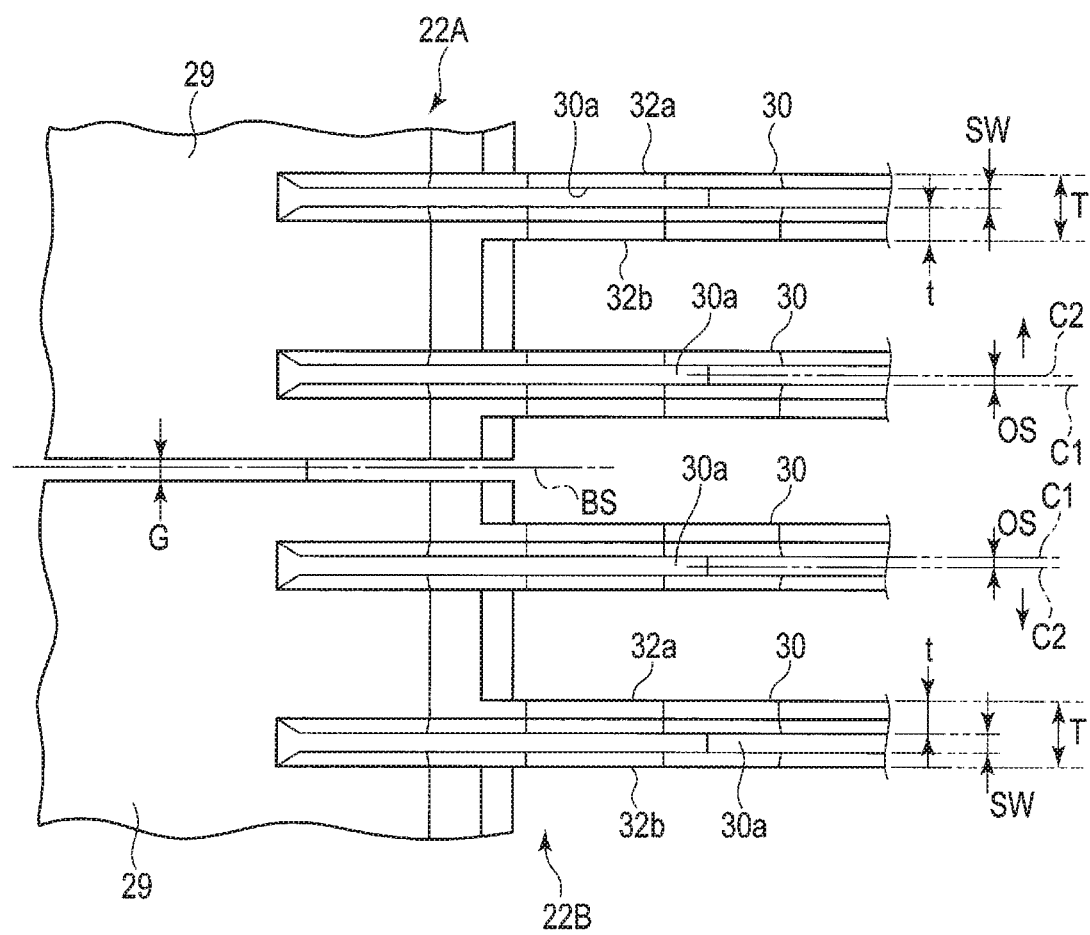
FIG. 7 is an enlarged side view illustrating the actuator blocks and arms.

As illustrated in FIGS. 6 and 7, each arm 30 has the slit 30a formed along the side face 32c. The slit 30a extends substantially parallel to the upper face 32a and the lower face 32b from the base end to the leading end of the arm 30. As an example, the thickness T of the arm 30 is 0.85 mm, and the width of the slit 30a (width in the thickness direction of the arm) SW is approximately 0.25 mm. In the present embodiment, the slit 30a is provided with an offset by a predetermined amount OS from a central line C1 passing through the center in the thickness direction of the arm 30 in the direction further away from the boundary plane BS between the first actuator assembly 22A and the second actuator assembly 22B. That is a central line C2 passing through the center in the width direction of the slit 30a is offset in position by the predetermined amount OS from the center in the thickness direction of the arm 30. For example, the offset amount OS is 0.1 mm.

In the first actuator assembly 22A disposed on the upper side, the slits 30a of the plurality of arms 30 are offset in the direction further away from the boundary plane (division plane) BS between the two actuator blocks 29, namely, upward in FIG. 7. In the second actuator assembly 22B disposed on the lower side, the slits 30a of the plurality of arms 30 are offset in the direction further away from the boundary plane BS, namely, downward in FIG. 7.

Note that the offset amount OS is not limited to 0.1 mm and is adjustable, for example, in the range of from 0.05 to 0.15 mm.

Figure 8:
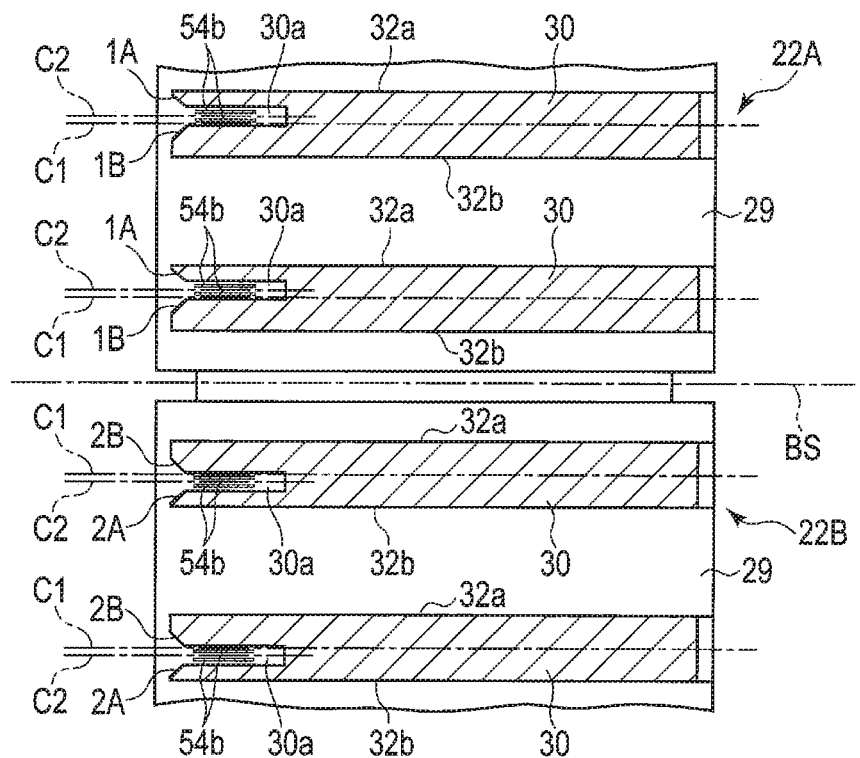
FIG. 8 is a cross-sectional view of arms taken along line A-A of FIG. 6.
Figure 9:
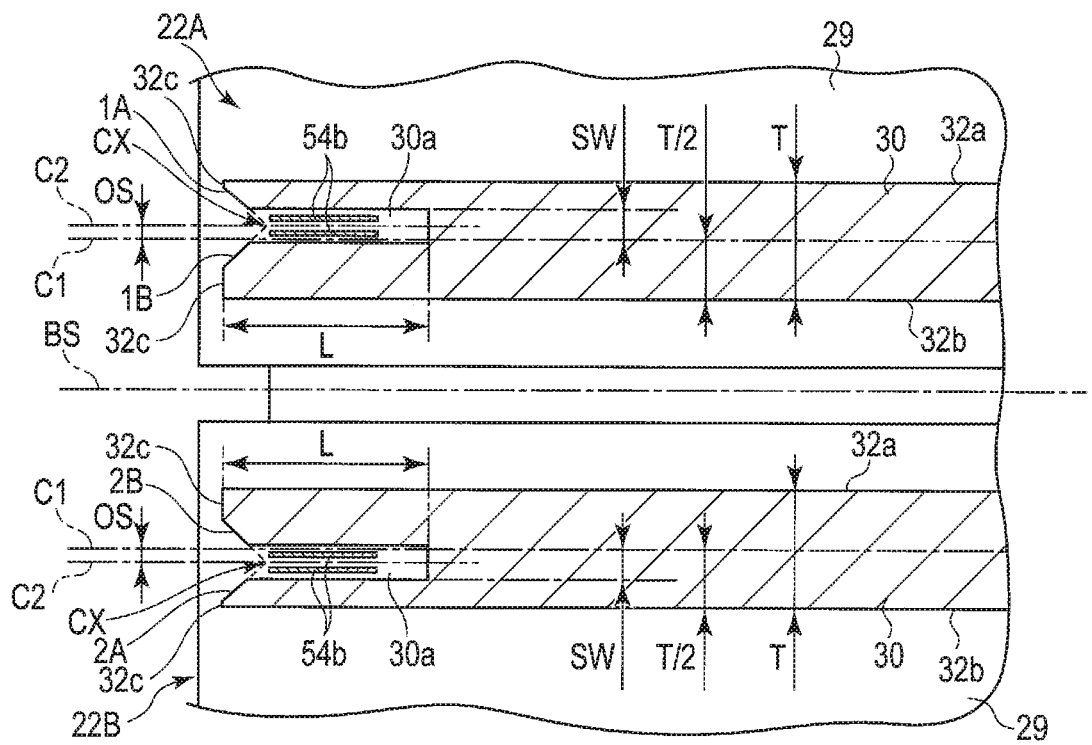
FIG. 9 is an enlarged cross-sectional view illustrating arms in part of FIG. 8.

FIG. 8 is a cross-sectional view of the actuator assemblies taken along line A-A of FIG. 6. FIG. 9 is an enlarged cross-sectional view illustrating arms in part of FIG. 8.

As illustrated in FIGS. 8 and 9, the slit 30a of each arm 30 extends substantially parallel to the upper face 32a and the lower face 32b of the arm 30 from the side face 32c to the other side face of the arm 30. The length L in the depth direction of the slit 30a is sufficiently larger than the width of the proximal end-side portion 54b of the flexure to be housed in the slit 30a.

In the first actuator assembly 22A, each slit 30a has an opening at the side face 32c of the arm 30. Provided is a longitudinal pair of chamfered (C) faces (first inclined face and second inclined face) 1A and 1B inclining in the direction in which the width of the opening widens, resulting from chamfering of the upper and lower edge portions of the open end of the opening. As an example, the C faces 1A and 1B each incline at an angle of approximately 45 degrees to the central line C2 of the slit 30a. In addition, the pair of C faces 1A and 1B is positioned such that the virtual intersection CX of the respective extended lines of the C faces 1A and 1B is positioned on the central line C2 of the slit 30a. This arrangement results in formation of the C face 1A and the C face 1B identical in width.

In the second actuator assembly 22B, each silt 30a has an opening at the side face 32c of the arm 30. Provided is a longitudinal pair of C faces (first inclined face and second inclined face) 2A and 2B inclining in the direction in which the width of the opening widens, resulting from chamfering of the upper and lower edge portions of the open end of the opening. As an example, the C faces 2A and 2B each incline at an angle of approximately 45 degrees to the central line C2 of the slit 30a. In addition, the pair of C faces 2A and 2B is positioned such that the virtual intersection CX of the respective extended lines of the C faces 2A and 2B is positioned on the central line C2 of the slit 30a. This arrangement results in formation of the C face 2A and the C face 2B identical in width.

As described above, the open end of each slit 30a is provided with a pair of C faces 1A and 1B (2A and 2B), so that the flexures 54 can be easily inserted into the slits 30a without damage when the flexures 54 are housed into the slits 30a.

As illustrated in FIG. 6, the proximal end-side portion 54b of each flexure 54 is housed in the slit 30a of the arm 30, and the connection end portion 55 disposed in layers on the connection-pad group 60 at the coupling portion 46 in the FPC unit is coupled with the connection pads 61. In this case, as described above, because each slit 30a is offset, the proximal end-side portions 54b and the connection end portions 55 are disposed at a position displaced by the offset amount OS in the direction further away from the boundary plane BS.

This arrangement enables the interval between the connection end portions 55 disposed in close proximity to the boundary plane BS, namely, the interval between the lowermost connection end portion 55 in the first actuator assembly 22A and the uppermost connection end portion 55 in the second actuator assembly 22B, to be enlarged by the double of the offset amount OS. In addition, each connection end portion 55 is disposed at a position offset in the direction further away from the boundary plane BS. Thus, even for the connection end portion 55 closest to the boundary plane BS in each actuator block 29, the connection terminals 58 can be disposed right on the connection-pad group 60 provided at the coupling portion 46. Therefore, the connection terminals 58 of each connection end portion 55 can be soldered together with the connection pads 61 in proper position, resulting in improvement in the reliability of coupling.

According to the first embodiment with the above configuration, each of the slits 30a of the arms of the actuator assemblies is provided with the offset to the central line of the arm 30, so that a disk drive enabling proper coupling of the connection end portion 55 of each flexure 54 to the wiring board can be acquired. Furthermore, the width of the open end of each slit 30a is enlarged due to the C faces provided at the open end of each slit 30a, so that the flexures 54 can be easily housed into the slits 30a. Thus, improvement in assemblability can be achieved.

Moreover, the flexures 54 are not damaged at the time of housing, so that improvement in reliability can be achieved.

Note that, in the first embodiment, the offset amount OS to the slits is constant between the two actuator assemblies. However, this arrangement is not limitative, and thus the offset amount to the slits may be set every actuator assembly. The offset amount may vary every arm. In addition, the pair of C faces at the open end of each slit 30a is identical in inclined angle (e.g., 45 degrees). However, this arrangement is not limitative, and thus inclined faces mutually different in angle may be provided. For example, provided may be a combination of 30 and 60 degrees, 15 and 75 degrees, or 30 and 30 degrees in inclined angle.

The number of actuator assemblies is not limited to two and thus may be three or more. For example, in a case where three actuator assemblies are used, in the actuator assembly disposed in the middle, the arm positioned axially at the center at least needs to have a slit provided at the center in the thickness direction of the arm. An upper arm at least needs to have a slit provided with an offset in the direction further away from the boundary plane between the upper actuator assembly and the middle actuator assembly. A lower arm at least needs to have a slit provided with an offset in the direction further away from the boundary plane between the lower actuator assembly and the middle actuator assembly.

Next, respective head actuator assemblies of HDDs according to other embodiments will be described. In the other embodiments to be described below, parts the same as those in the first embodiment are denoted with the same reference signs. The detailed descriptions thereof will be omitted or simplified, and the difference from the first embodiment will be mainly described.

Second Embodiment

Figure 10:
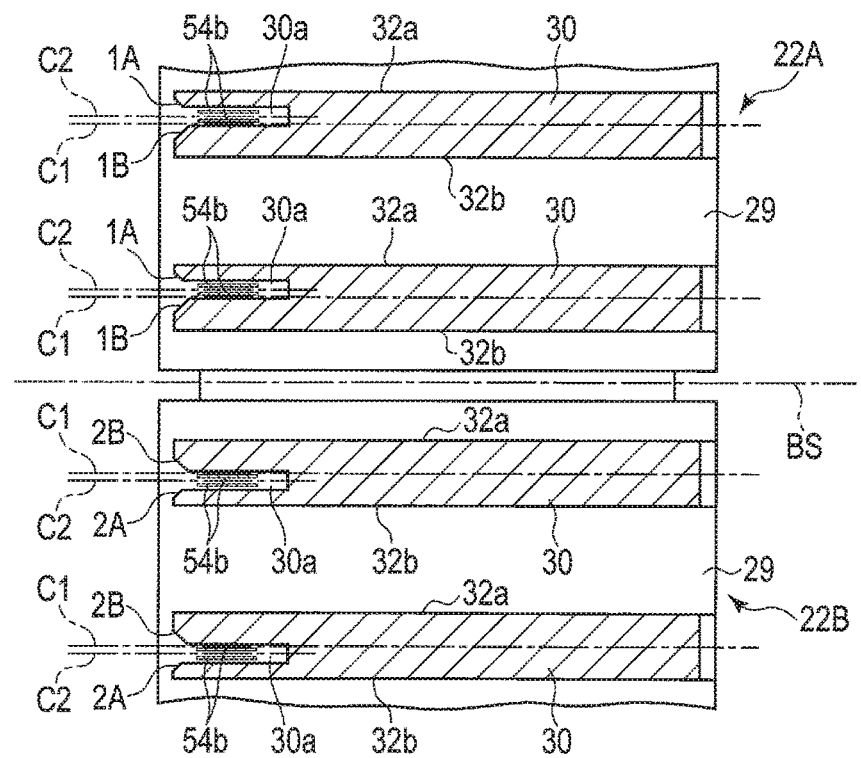
FIG. 10 is a cross-sectional view of arms in a HDD according to a second embodiment.

FIG. 10 is a cross-sectional view of actuator assemblies of a HDD according to a second embodiment.

Figure 11:
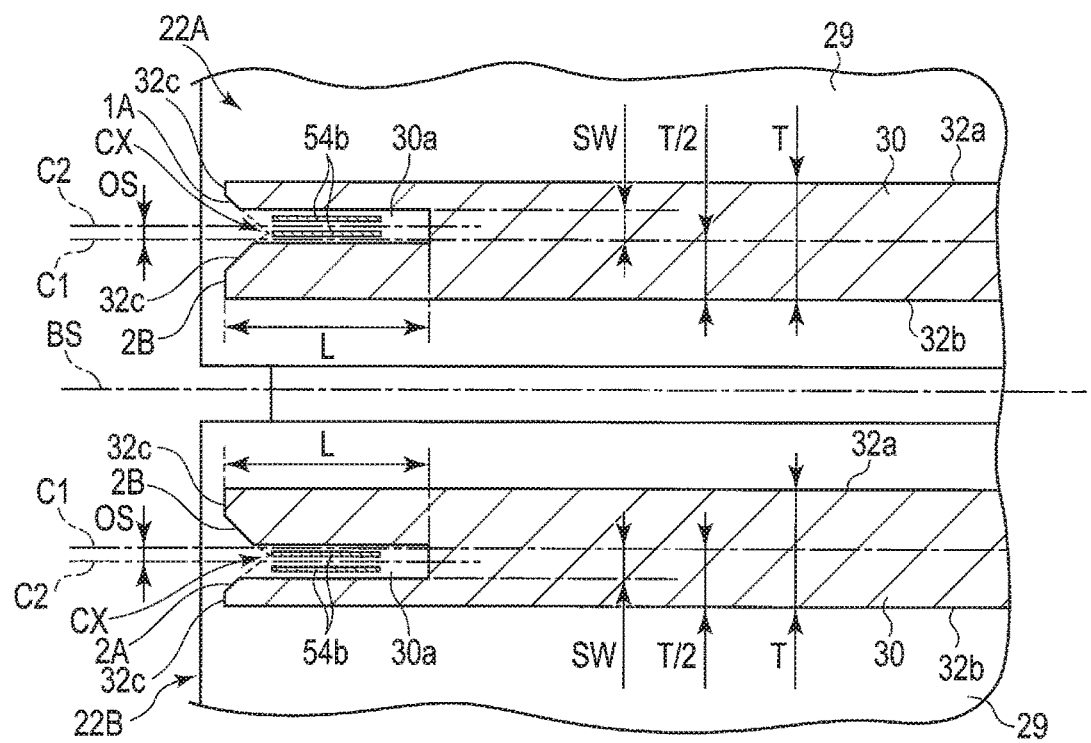
FIG. 11 is an enlarged cross-sectional view illustrating arms in part of FIG. 10.

FIG. 11 is an enlarged cross-sectional view illustrating arms in part of FIG. 10.

As illustrated, according to the second embodiment, in a first actuator assembly 22A, each slit 30a has an opening at a side face 32c of the corresponding arm 30. Provided is a longitudinal pair of C faces (inclined faces) 1A and 1B inclining in the direction in which the width of the opening widens, resulting from chamfering of the upper and lower edge portions of the open end of the opening. As an example, the C faces 1A and 1B each incline at an angle of approximately 45 degrees to a central line C2 of the slit 30a. In addition, the pair of C faces 1A and 1B is positioned such that the virtual intersection CX of the respective extended lines of the C faces 1A and 1B is positioned between the central line C2 of the slit 30a and a central line C1 of the arm 30. This arrangement results in formation of the C face 1B larger in width than the C face 1A (C face 1B>C face 1A).

The C faces 1A and 1B are provided closer to the central line C1 of the arm 30, resulting in an increase in the width of the side face 32c that remains between the C face 1A and an upper face 32a of the arm 30. Thus, the side edge portion of the arm 30 between the C face 1A and the upper face 32a has an obtuse angle. Therefore, for example, any burr can be inhibited from occurring at the side edge portion. In addition, even in a case where the thickness of each arm 30 is thin, the width of the C face 1A can be secured.

In a second actuator assembly 22B, each slit 30a has an opening at a side face 32c of the corresponding arm 30. Provided is a longitudinal pair of C faces (inclined faces) 2A and 2B inclining in the direction in which the width of the opening widens, resulting from chamfering of the upper and lower edge portions of the open end of the opening. As an example, the C faces 2A and 2B each incline at an angle of approximately 45 degrees to a central line C2 of the slit 30a. The pair of C faces 2A and 2B is positioned such that virtual intersection CX of the respective extended lines of the C faces 2A and 2B is positioned between the central line C2 of the slit 30a and a central line C1 of the arm 30. This arrangement results in formation of the C face 2B larger in width than the C face 2A (C face 2B>C face 2A).

Note that the C faces 2A and 2B of each slit 30a and the C faces 1A and 1B of each slit 30a are symmetrical across the boundary plane BS between the first actuator assembly 22A and the second actuator assembly 22B. The C face 2A and the C face 1A are identical in width, and the C face 2B and the C face 1B are identical in width.

The C faces 2A and 2B are provided closer to the central line C1 of the arm 30, resulting in an increase in the width of the side face 32c that remains between the C face 2A and a lower face 32b of the arm 30. Thus, the side edge portion of the arm 30 between the C face 2A and the lower face 32b has an obtuse angle. Therefore, for example, any burr can be inhibited from occurring at the side edge portion. In addition, even in a case where the thickness of each arm 30 is thin, the width of the C face 2A can be secured.

The HDD according to the second embodiment is identical in the remaining configuration to the HDD according to the first embodiment. The second embodiment enables acquisition of functional effect similar to that in the first embodiment.

Third Embodiment

Figure 12:
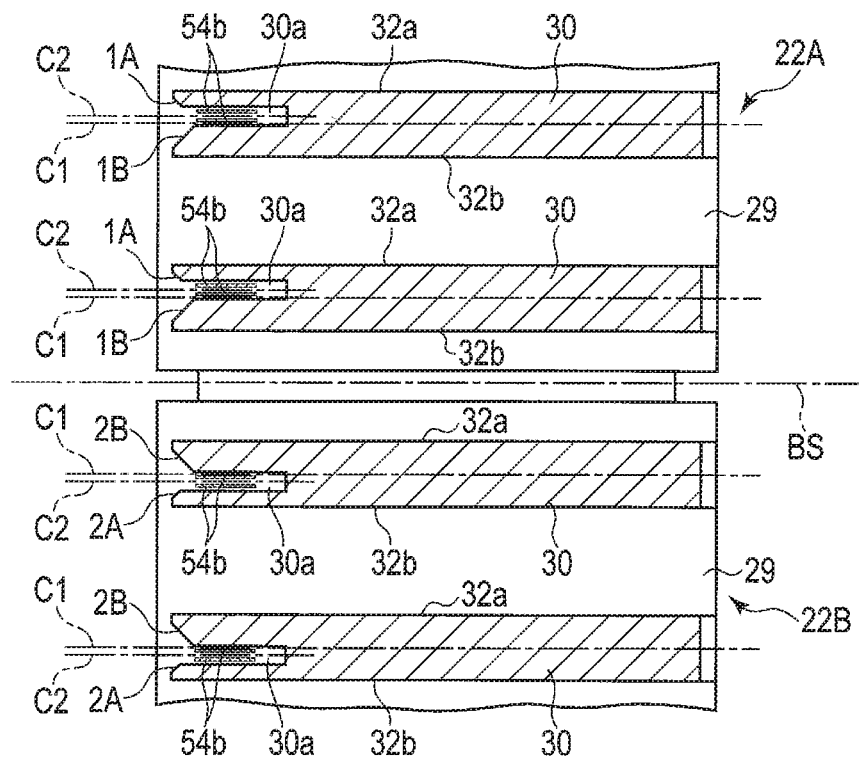
FIG. 12 is a cross-sectional view of arms in a HDD according to a third embodiment.

FIG. 12 is a cross-sectional view of actuator assemblies of a HDD according to a third embodiment.

Figure 13:
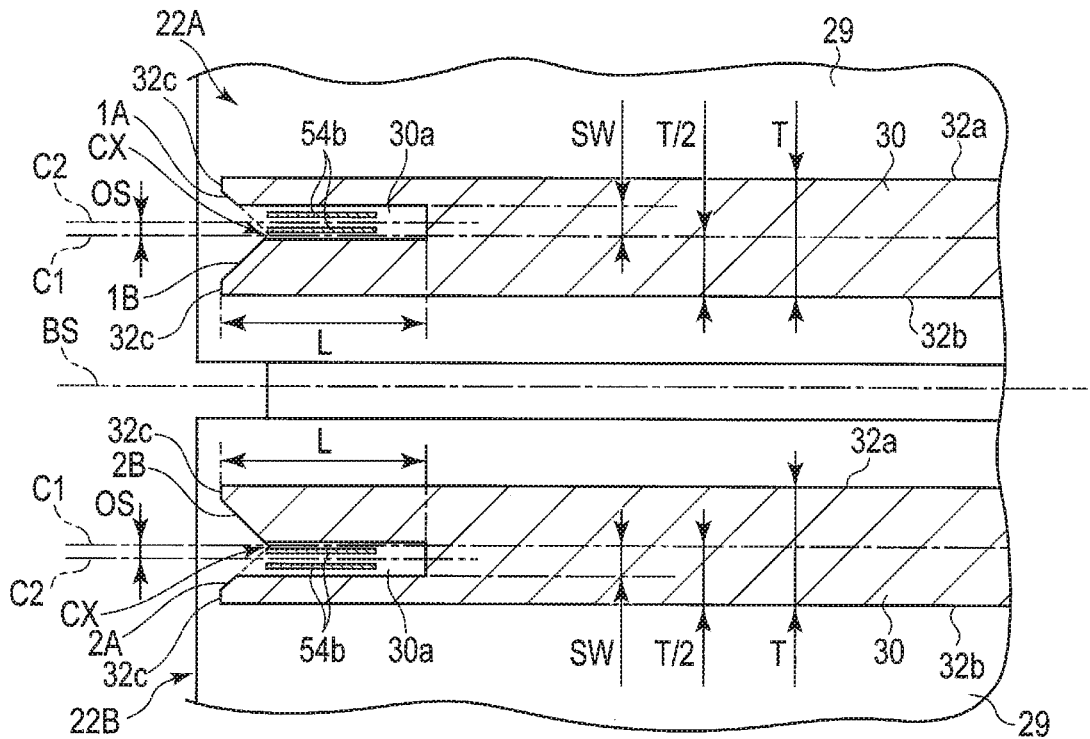
FIG. 13 is an enlarged cross-sectional view illustrating arms in part of FIG. 12.

FIG. 13 is an enlarged cross-sectional view illustrating arms in part of FIG. 12.

As illustrated, according to the third embodiment, in a first actuator assembly 22A, a longitudinal pair of C faces (inclined faces) 1A and 1B provided at the open end of each slit 30a inclines at approximately 45 degrees to a central line C1 of the corresponding arm 30. The pair of C faces 1A and 1B is positioned such that the virtual intersection CX of the respective extended lines of the C faces 1A and 1B is positioned on the central line C1 of the arm 30. This arrangement results in formation of the C face 1B larger in width than the C face 1A (C face 1B>C face 1A). In addition, the portion that remains between the C face 1A and an upper face 32a of the arm 30 and the portion that remains between the C face 1B and a lower face 32b of the arm 30 are substantially identical in width on a side face 32c of the arm 30. Respective edge portions formed at both end portions of the side face 32c have an obtuse angle, so that, for example, any burr is inhibited from occurring.

In a second actuator assembly 22B, a longitudinal pair of C faces (inclined faces) 2A and 2B provided at the open end of each slit 30a inclines at approximately 45 degrees to a central line C1 of the corresponding arm 30. The pair of C faces 2A and 2B is positioned such that the virtual intersection CX of the respective extended lines of the C faces 2A and 2B is positioned on the central line C1 of the arm 30. This arrangement results in formation of the C face 2B larger in width than the C face 2A (C face 2B>C face 2A). In addition, the portion that remains between the C face 2A and a lower face 32b of the arm 30 and the portion that remains between the C face 2B and an upper face 32a of the arm 30 are substantially identical in width on a side face 32c of the arm 30. Respective edge portions formed at both end portions of the side face 32c have an obtuse angle, so that, for example, any burr is inhibited from occurring.

Note that the C faces 2A and 2B of each slit 30a and the C faces 1A and 1B of each slit 30a are symmetrical across the boundary plane BS between the first actuator assembly 22A and the second actuator assembly 22B. The C face 2A and the C face 1A are identical in width, and the C face 2B and the C face 1B are identical in width.

The HDD according to the third embodiment is identical in the remaining configuration to the HDD according to the first embodiment. The third embodiment enables acquisition of functional effect similar to those in the first embodiment and the second embodiment.

Note that, in the second embodiment and the third embodiment, the pair of C faces at the open end of each slit 30a is identical in inclined angle (e.g., 45 degrees). However, this arrangement is not limitative, and thus inclined faces mutually different in angle may be provided. For example, provided may be a combination of 30 and 60 degrees, 15 and 75 degrees, or 30 and 30 degrees in inclined angle. In addition, the first actuator assembly and the second actuator assembly may be different in C-face inclined angle.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The number of actuator assemblies is not limited to two, such as the first and second actuator assemblies described above. Thus, three actuator assemblies or more may be supported rotatably around a shared support shaft.

The number of magnetic disks is not limited to nine, and thus may be not more than eight or not less than ten. The number of head suspension assemblies and the number of magnetic heads at least need to be adjusted in accordance with the number of magnetic disks to be installed. The number of connection terminals in the connection end portion of each flexure is not limited to nine, and thus is adjustable as necessary. The constituent elements of the disk drive are not limited in material, shape, size, and the like, to each embodiment, and thus can be variously altered as necessary.

What is claimed is:

1. A disk drive comprising:
   a plurality of disk-shape recording media provided rotatably;
   a first actuator assembly comprising:
      a first actuator block supported rotatably around a support shaft;
      a plurality of arms extending from the first actuator block;
      a plurality of head suspension assemblies each comprising a support plate fixed to an extending end of the respective arms, a wiring member attached to the support plate, and a head supported by the wiring member; and a first wiring board including a plurality of connection terminals and provided at the first actuator block; and
   a second actuator assembly comprising:
      a second actuator block supported rotatably around the support shaft and opposed to the first actuator block with a gap therebetween;
      a plurality of arms extending from the second actuator block;
      a plurality of head suspension assemblies each comprising a support plate fixed to an extending end of the respective arms, a wiring member attached to the support plate, and a head supported by the wiring member; and a second wiring board including a plurality of connection terminals and provided at the second actuator block, wherein in the first actuator assembly, each of the arms includes a first face substantially parallel to the recording media, a second face opposed to the first face, a side face intersecting the first face and the second face, and a slit provided at the side face, the slit extending from the extending end of the arm to the first actuator block, the slit is provided such that a central line passing through a center of the slit in its width direction is offset in position from a central line passing through a center of the arm in its thickness direction in a direction further away from a boundary plane between the first actuator assembly and the second actuator assembly, each of the arms includes a first inclined face and a second inclined face formed at an open end portion of the slit, the first inclined face and the second inclined face being inclined with respect to the central line of the slit in directions in which an open width of the slit widens, and each of the wiring members comprises a leading-end-side portion disposed on the support plate, a proximal end-side portion disposed in the slit of the arm and extending to the first actuator block, and a connection end portion extending from the proximal end-side portion and connected to the connection terminals of the first wiring board.

2. The disk drive of claim 1, wherein in the second actuator assembly, each of the arms includes a first face substantially parallel to the recording media, a second face opposed to the first face, a side face intersecting the first face and the second face, and a slit provided at the side face, the slit extending from the extending end of the arm to the second actuator block, the slit is provided such that a central line passing through a center of the slit in its width direction is offset in position from a central line passing through a center of the arm in its thickness direction in a direction further away from the boundary plane, each of the arms includes a first inclined face and a second inclined face formed at an open end portion of the slit, the first inclined face and the second inclined face being inclined with respect to the central line of the slit in directions in which an open width of the slit widens, and each of the wiring members comprises a leading-end-side portion disposed on the support plate, a proximal end-side portion disposed in the slit of the arm and extending to the first actuator block, and a connection end portion extending from the proximal end-side portion and connected to the connection terminals of the second wiring board.

3. The disk drive of claim 1, wherein the first inclined face and the second inclined face of each of the arms are positioned such that an intersection of an extended line of the first inclined face and an extended line of the second inclined face is positioned on the central line of the slit.

4. The disk drive of claim 1, wherein the first inclined face and the second inclined face of each of the arms are positioned such that an intersection of an extended line of the first inclined face and an extended line of the second inclined face is positioned on the central line of the arm.

5. The disk drive of claim 1, wherein the first inclined face and the second inclined face incline at mutually identical angles to the central line of the slit.

6. The disk drive of claim 1, wherein the first inclined face and the second inclined face incline at mutually different angles to the central line of the slit.

7. The disk drive of claim 1, wherein an amount of the offset ranges from 0.05 to 30 0.15 mm.

8. A disk drive comprising:

a first actuator assembly comprising: a first actuator block supported rotatably around a support shaft; a plurality of arms extending from the first actuator block; and wiring members provided at the respective arms; and a second actuator assembly comprising: a second actuator block supported rotatably around the support shaft and opposed to the first actuator block with a gap therebetween; a plurality of arms extending from the second actuator block; and wiring members provided at the respective arms, wherein in the first actuator assembly, each of the arms includes a slit extending substantially parallel to the arm, a part of the wiring member is disposed in the slit, the slit is provided such that a central line passing through a center of the slit in its width direction is offset in position from a central line passing through a center in a thickness direction of the arm in a direction further away from a boundary plane between the first actuator assembly and the second actuator assembly, and each of the arms includes a first inclined face and a second inclined face formed at an open end portion of the slit, the first inclined face and the second inclined face being inclined with respect to the central line of the slit in directions in which an open width of the slit widens.

9. The disk drive of claim 8, wherein the first inclined face and the second inclined face of each of the arms are positioned such that an intersection of an extended line of the first inclined face and an extended line of the second inclined face is positioned on the central line of the slit.

10. The disk drive of claim 8, wherein the first inclined face and the second inclined face of each of the arms are positioned such that an intersection of an extended line of the first inclined face and an extended line of the second inclined face is positioned on the central line of the arm.

11. The disk drive of claim 8, wherein the first inclined face and the second inclined face incline at mutually identical angles to the central line of the slit.

12. The disk drive of claim 8, wherein the first inclined face and the second inclined face incline at mutually different angles to the central line of the slit.

* * * * *